United States Patent [19]

Halasa

[11] 3,988,504

[45] Oct. 26, 1976

[54] CATALYSTS FOR THE HYDROGENATION OF UNSATURATED HYDROCARBON POLYMERS

[75] Inventor: Adel Farhan Halasa, Bath, Ohio

[73] Assignee: The Firestone Tire & Rubber Company, Akron, Ohio

[22] Filed: July 24, 1975

[21] Appl. No.: 598,920

[52] U.S. Cl. .................................. 526/25; 260/404; 526/20; 526/21
[51] Int. Cl.² .......................................... C08F 8/04
[58] Field of Search ................. 260/94.7 H, 96 HY; 450/610.5; 526/25

[56] References Cited
UNITED STATES PATENTS

| | | | |
|---|---|---|---|
| 3,531,445 | 9/1970 | Yoshimoto et al. | 260/94.7 HX |
| 3,625,927 | 12/1971 | Yoshimoto et al. | 260/94.7 HX |
| 3,673,281 | 6/1972 | Bronstert et al. | 260/94.7 HX |
| 3,868,354 | 2/1975 | Halasa | 260/94.7 H |
| 3,872,072 | 3/1975 | Halasa | 260/94.7 H |

*Primary Examiner*—William F. Hamrock

[57] ABSTRACT

A hydrogenation catalyst for unsaturated hydrocarbon polymers is made by reducing a ligand metal salt with either a trialkyl aluminum or a dialkyl aluminum hydride compound. The catalysts easily and readily promotes a hydrogenation process.

17 Claims, No Drawings

CATALYSTS FOR THE HYDROGENATION OF UNSATURATED HYDROCARBON POLYMERS

BACKGROUND OF THE INVENTION

The present invention relates to specific catalysts which are utilized in the hydrogenation of unsaturated hydrocarbon polymers and particularly unsaturated rubber polymers.

Heretofore, various catalysts have been utilized for the hydrogenation of unsaturated polymers such as rubber. However, all of the prior art catalysts are different from reactant compounds of the present invention utilized to make the catalysts. Additionally, some prior art catalysts are difficult and/or expensive to prepare while the catalysts of the present invention are easily and inexpensively formulated.

An early prior art patent, to Breslow, U.S. Pat. No. 3,113,986, relates to the utilization of heavy metal alkoxides or acetylacetonates. U.S. Pat. No. 3,412,174, to Kroll, relates to the reaction product of a transition-metal salt (for example, a cobalt salt of a carboxylic acid), an organometallic (for example, a triisobutyl aluminum) and a Lewis base or weak acids, as a catalyst for hydrogenation. However, the catalysts are ineffective at high temperatures and generally unstable for long periods of time. The patent to LaPorte, U.S. Pat. No. 3,025,278 is substantially identical to that of Kroll.

The patent to Yoshimoto, U.S. Pat. No. 3,531,450, utilizes as a catalyst a nickel compound which must be a carboxylate, chelate or sulfonate and a solvent for preparing the catalysts which must be a chlorinated hydrocarbon or ether. Another Yoshimoto Patent, U.S. Pat. No. 3,625,927, relates to a catalyst wherein a chelating agent is attached to a metal through both a nitrogen atom and an oxygen atom.

Additionally, U.S. Pat. No. 3,868,354 to Halasa, relates to the use of a catalyst which is the reaction product of a cobalt salt of a lactam or other amide or urea reduced by a trialkyl or triaryl aluminum or a dialkyl or diaryl aluminum hydride. Another patent to Halasa, U.S. Pat. No. 3,872,072, relates to a catalyst which is a complex of cobalt chloride and from 1 to 8 molecules of lactam or other amide or urea compound reduced by a trialkyl or triaryl aluminum or a dialkyl or diaryl aluminum hydride. U.S. Pat. No. 3,882,094, also to Halasa, relates to a hydrogenation catalysts which is the reaction product of a complex of pyridine and cobalt chloride, and trialkyl aluminum or dialkyl aluminum hydride.

In contrast, the catalysts of the present invention are different than the prior art, is very effective in hydrogenating unsaturated polymers and is easily and readily prepared.

SUMMARY OF THE INVENTION

It is an object of the present invention to provide a catalyst for the hydrogenation of unsaturated polymers.

It is another object of the present invention to provide a hydrogenation catalyst, as above, which contains a Group VIII metal.

It is a further object of the present invention to provide a hydrogenation catalyst, as above, wherein the metal is cobalt, nickel, or iron.

It is yet another object of the present invention to provide a hydrogenation catalyst, as above, wherein the catalyst is formed from a ligand metal salt wherein the metal is attached to a nitrogen atom.

It is yet another object of the present invention to provide a hydrogenation catalyst, as above, wherein the ligand has the general formula:

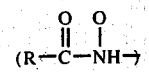

where R is an aliphatic having from 1 to about 20 carbon atoms, a cycloaliphatic having from 4 to about 20 carbon atoms, an aromatic having from 6 to about 20 carbon atoms and combinations thereof.

It is yet another object of the present invention to provide a hydrogenation catalyst, as above, wherein the metal salt is reduced with a trialkyl aluminum or a dialkyl aluminum hydride to form the catalyst compound.

It is yet another object of the present invention to provide a hydrogenation catalyst, as above, which is easily and readily prepared from conventional components, is very affective and is inexpensive to produce.

It is yet another object of the present invention to provide a catalyst, as above, which is readily utilized and effective in processes for the hydrogenation of unsaturated polymers.

These and other objects of the present invention will become apparent from the following specification which describe in detail various embodiments without attempting to discuss all of the modifications in which the invention might be embodied; the invention being measured by the appended claims and not by the details of the specification.

In general, a compound comprising a metal ligand salt has the formula:

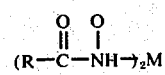

where R is selected from the class consisting of an aliphatic having from 1 to about 20 carbon atoms, a cycloaliphatic having from 4 to about 20 carbon atoms, an aromatic having from 6 to about 20 carbon atoms, and combinations thereof and where M is a Group VIII metal. Additionally, a hydrogenation catalyst comprises a compound having the formula:

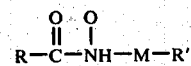

where R is the same as set forth immediately above, M is a Group VIII metal and R' is an alkyl group containing from 1 to about 20 carbon atoms.

In general, a process for the hydrogenation of unsaturated polymers comprises reacting hydrogen with the unsaturated polymer in the presence of a catalyst, said catalyst formed by the reaction of a ligand metallic salt having a formula set forth above with a trialkyl aluminum or a dialkyl aluminum hydride compound wherein said alkyl has from 1 to about 20 carbon atoms, and carrying out the hydrogenation in the presence of hydrogen at a temperature of from about −20° C to about 500° C at a pressure of about 1 atmosphere to about 15,000 PSIG.

PREFERRED EMBODIMENTS OF THE INVENTION

According to the concepts of the present invention, an effective catalyst is utilized in the hydrogenation of unsaturated hydrocarbon polymers. Generally, the unsaturated polymers are made from polyunsaturated monomers containing from 4 to about 20 carbon atoms may be dienes, trienes, or the like. Preferably, the polymers are rubber or elastomeric compounds made from monomers containing from 4 to about 13 carbon atoms and particularly from 4 to about 8 carbon atoms. Specific examples include natural rubber, polybutadiene, polyisoprene, polypiperylene, copolymers of propylene-butadiene, butadiene-acrylonitrile, ethylene-butadiene, styrene-butadiene, butadiene-isoprene, butadiene-methyl acrylate, butadiene-alkyl derivatives of styrene such as alpha methyl styrene and the like. Particularly preferred rubbers for the present invention include natural rubber, polyisoprene, polybutadiene, styrene-butadiene and alpha methyl styrene-butadiene. The unsaturated hydrocarbon polymers are generally prepared according to any conventional manner well known to those skilled in the art. Accordingly, the various unsaturated rubber polymers may be prepared through anionic polymerization utilizing conventional catalysts such as alkyl lithium (for example, n-butyl lithium) through free radical polymerization, and through the use of Grignard agents, and utilize various temperatures, presures and the like, all as well known to those skilled in the art.

The catalysts of the present invention are formed by the reaction of a Group VIII ligand salt which is reduced by a trialkyl aluminum or a dialkyl aluminum hydride compound. Generally, the alkyl groups may contain from 1 to about 20 carbon atoms with 1 to 8 carbon atoms being preferred. The alkyl groups of methyl, ethyl, and isobutyl are particularly preferred. An excess of the mole ratio of the reducing agent to the ligand metal salt is desirable such as from about 1 to about 10 with a preferred amount ratio being approximately 3. Low ratios, that is, below 1, should be avoided since they form poor hydrogenation catalysts.

The Group VIII metal ligand salt of the present invention has the general formula:

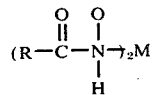

where M, of course, is a Group VIII metal. R can generally be an aliphatic containing from 1 to about 20 carbon atoms, a cycloaliphatic containing from 4 to about 20 carbon atoms, and aromatic containing from 6 to about 20 carbon atoms and combinations thereof, and thus, of course, polyaromatics, aliphatic substituted aromatics containing from 7 to about 20 carbon atoms and substituted aliphatic cycloaliphatics containing from 5 to about 20 carbon atoms. A preferred range of the number of carbon atoms is from about 6 to 7 to about 20 since this range is found to give good solubility and stability to the metal salt. Examples of preferred R groups which can be utilized in the present invention include hexyl, heptyl and octyl. A particularly preferred group is phenyl. Of the various Group VIII metals, iron, nickel, and cobalt are preferred. As apparent from the above formulation of the salt, the metal is directly attached to only a nitrogen atom and thus no internal chain structure is formed.

The metal salt may be easily prepared at ambient temperatures and at or about atmospheric pressure using compounds which are generally inexpensive. For Example, one method of preparation utilizes hydroxamine reacted with an aliphatic acid halogne such as benzoyl chloride wherein the halogen of said acid compound is replaced by hydroxamine. Thus, utilizing benzoyl chloride, benzohydroxamic acid is formed. Then, a Group I or a Group II hydroxide base is reacted with the formed hydroxamic acid in the presence of a Group VIII metal halogen or a Group VIII metal carbonate to yield the ligand metal salt of the present invention. Specific examples of a base include LiOH, KOH, Ca(OH)$_2$, Mg(OH)$_2$ and Be(OH)$_2$. Specific examples of a Group VIII metal halogen includes the fluorides of nickel, cobalt and iron, the bromides of nickel, cobalt and iron and the iodides of nickel, cobalt and iron. Preferred metal halogens include CoCl$_2$, NiCl$_2$, and FeCl$_2$. Examples of specific carbonates include the carbonates of nickel, cobalt and iron. The salt formed by the reaction of the base, for example, sodium hydroxide and the Group VIII metal salt, such as CoCl$_2$, which in this particular instance is NaCl, is generally easily separated from the ligand metallic salt complex of the present invention as by filtration with the remaining ligand salt being dried by a vacuum.

The ligand metal salt is then reduced by the trialkyl aluminum or the dialkyl aluminum hydride compound with a catalyst product being formed having the formula:

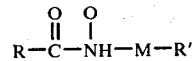

where R' is the aluminum alkyl group, which catalysts is soluble and readily promotes hydrogenation of the unsaturated hydrocarbon polymer. Generally, the hydrogenation is carried out in an inert solvent such as cyclohexane, toluene, hexane, cyclohexene and the like. The amount of the Group VIII metal salt of the ligand complex can, of course, vary over a wide range. Generally, a range of from about 0.3mM to about 10.0mM per 100 grams of unsaturated hydrocarbon polymer or rubber polymer may be utilized with a range of about 0.2mM to about 2.0mM being preferred and an amount of 1 millimole generally being highly satisfactory. During the reaction between the Group VIII ligand with the aluminum compound, the metal is reduced from a valence of 2 to 1 and a product is formed containing the ligand, the metal salt such as nickel, cobalt, or iron and the alkyl portion of the aluminum compound. This reaction product has been found to readily catalize the hydrogenation reaction.

The hydrogenation reaction may be carried out in any conventional equipment such as a pressure vessel and the like containing the necessary plumbing such as a hydrogen inlet, a pressure gauge, a temperature gauge, and the like such as, for example, a stainless steel autoclave. Generally, the hydrogenation reaction can be carried out to temperatures ranging from about −20° C to about 500° C with the preferred temperature range of from about −20° C to about 150° C. the pressure may generally range from about 1 atmosphere to about 15,000 PSIG with a preferred range being from 1 atmosphere to 3,000 PSIG. A highly preferred pressure range extends from about 25 to about 1,000 PSIG.

In the hydrogenation of rubber compounds that contain terminal or internal olefinic units such as polybutadiene, polyisoprene, copolymers of butadieneisoprene, butadiene-propylene and isoprene-propylene, the preferred temperature range is from about 0° C to about 80° C at a pressure of about 25 to about 500 PSIG. If the rubber polymers contain an aromatic group such as butadiene-styrene, butadiene-alpha methyl styrene, and the like or contain a nitrile group such as butadine-acrylonitrile, the preferred hydrogenation conditions are a temperature range of from about 0° C to about 100° C with a pressure of from about 500 to about 15,000 PSIG.

The hydrogenation reaction generally proceeds immediately and is complete within a relatively short period of time as about one or two hours. Of course, the time period is not critical and may vary depending on the amount of catalysts utilized, the type of catalysts, the temperature, the pressure and the like. Thus, the hydrogenation time may vary from as little as about one minute to about 20 hours. Although the present catalysts may be utilized for both internal and terminal olefins, hydrogenation of terminal olefins tends to be slightly favored.

The hydrogenated polymers, particularly the rubber polymers may be used as thermoplastic elastomers. These polymers have better heat stability at high temperatures as well as better oxidation degratation resistance. Specific areas of utilization include tires, hoses, shoe soles, upholstery, especially in automobiles, luggage, use as adhesives and the like.

The present invention will be better understood by the following examples.

Example I relates to the preparation of the Group VIII metal ligand salt.

EXAMPLE I

An aqueous molar solution of sodium benzohydroxamic was made in a 2 liter round bottom flask. To this solution was added half a mole of cobalt chloride hexahydrate. The pink precipitate was collected by filtration. The solid was vacuum dried under hose vacuum at 50° C. The yield of cobalt benzohydroxamic acid was quantitative.

The above procedure was repeated using nickel chloride. The greenish solid collected, nickel benzohydroxamic acid, was also dried under house vacuum at 50° C.

A known amount of each solid was weighed and dispersed in 200 ml of anhydrous toluene. The dispersed solid in toluene was cooled to 0° C to −50° C. After cooling, triisobutyl aluminum was added and the color changed to wine red and the solution became homogeneous. This was then immediately added to the rubber for hydrogenation and in two hours the theoretical amount of hydrogen was consumed by the rubber. A sample of this hydrogenated rubber was submitted for nuclear magnetic resonance (NMR) which showed the absence of any olefinic protons between 5.5 and 6.2 ppm. This suggests that 99 percent of the double bond in the polymer had been saturated.

The Chemical formulas for the catalyst formation are as follows:

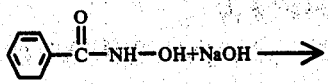

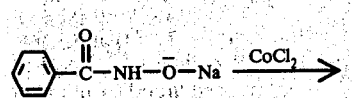

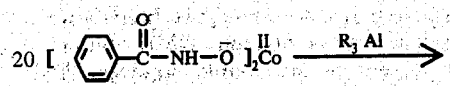

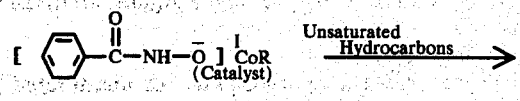

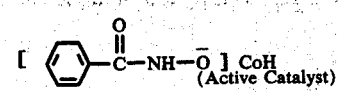

Example II relates to the hydrogenation of polybutadienes.

EXAMPLE II

To a two gallon reactor charged with 1089 grams of 1,3-butadiene in hexane (25 percent butadiene) was added 7.0 millimoles of n-butyl lithium. Polymerization was conducted anionically at 50° C for 2 to 3 hours. One hundred percent conversion of the butadiene was obtained. The polybutadiene solution was then diluted with an equal amount of hexane to reduce the viscosity of the solution to a 10 percent concentration.

10.9 millimole of a cobalt or nickel benzohydroxamic acid prepared in accordance with Example I was dispersed in 200 milliliters of toluene then cooled to approximately 0° to −5° C. The ligand salt was then reduced with 32.7 millimoles of triisobutyl aluminum. After the green color of the solution changed to wine red, the solution was charged to a hydrogenation reaction vessel and pressurized to 200 PSIG of hydrogen. Immediately, the pressure of the vessel started dropping indicating the incorporation of hydrogen into the polybutadiene. The reactant was maintained at a pressure of about 200 PSIG and after two to about four hours, hydrogenation was completed.

EXAMPLE III

The saturation of Bd-styrene random copolymer was carried out as follows:

Bd-styrene (1089 grams) dissolved in hexane was obtained from production lines made by anionic polymerization processes. This cement (Bd-styrene 20 percent in 80 percent hexane) was diluted with more hexane to 10 percent concentration in 90 percent hexane and charged into a one gallon reactor. The reactor was purged several times with hydrogen. Then 10.9 mM of nickel-benzohydroxamic acid in its reduced form (10.9 mM nickel benzohydroxamic acid 32.7 mM triisobutyl aluminum in 200 ml of toluene at 0° C) was then added to the reactor. The temperature of the reactor was then adjusted to 180° C. The reactor pressure was adjusted to 200 PSIG of hydrogen. Hydrogen uptake started and the pressure was maintained for about two hours after which hydrogenation was completed. NMR analysis showed that 99 percent of the double bonds in the polymer had been saturated.

While in accordance with the patent statutes, preferred embodiments have been illustrated and described in detail, it is to be understood that the invention is not limited thereto; the scope of the invention being measured solely by the scope of the attached claims.

What is claimed is:

1. A process for the hydrogenation of unsaturated hydrocarbon polymers comprising, treating the polymers with a catalyst, said catalyst formed by the reaction of a ligand metallic salt and a reducing compound selected from the group consisting of trialkyl aluminum and dialkyl aluminum hydride, said ligand metallic salt having the formula:

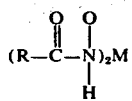

where R is an aliphatic having from 1 to about 20 carbon atoms, a cycloaliphatic having from about 4 to about 20 carbon atoms, an aromatic having from about 6 to about 20 carbon atoms, and combinations thereof, M is a Group VIII metal selected from the group consisting of iron, cobalt, and nickel, said alkyl of said reducing compound having from 1 to about 20 carbon atoms, adding hydrogen and carrying out the hydrogenation in the presence of hydrogen at a temperature of from about −20° C to about 500° C at a pressure of about 1 atmosphere to about 15,000 PSIG.

2. A process according to claim 1, wherein said polymers are made by polymerizing monomers selected from the group consisting of dienes and trienes having from 4 to about 20 carbon atoms.

3. A process according to claim 1, wherein said polymers are made by polymerizing unsaturated monomers having from 4 to about 13 carbon atoms.

4. A process according to claim 1, wherein the amount of said ligand metallic salt ranges from about 0.3 to about 10.0 millimoles per 100 grams of polymer and the ratio of said aluminum reducing agent to said ligand metallic salt ranges from about 1.0 to about 10.0.

5. A process according to claim 4, wherein said monomers are dienes having from 4 to about 13 carbon atoms.

6. A process according to claim 5, wherein said R of said ligand is an aliphatic having from 6 to about 20 carbon atoms, a cycloaliphatic having from about 6 to about 20 carbon atoms, an aromatic having from 6 to about 20 carbon atoms and combinations thereof.

7. A process according to claim 6, wherein said alkyl of the reducing agent has from 1 to about 8 carbon atoms.

8. A process according to claim 7, wherein said polymers are selected from the group consisting of natural rubbers, polybutadiene, polyisoprene, polypiperylene and copolymers of butadiene-ethylene, butadiene-propylene, butadiene-acrylonitrile, butadiene-isoprene, butadiene-styrene, butadiene-methyl acrylate, and butadiene-alpha methyl styrene.

9. A process according to claim 8, wherein R is selected from the group consisting of phenyl.

10. A process according to claim 8, wherein said alkyl group of said reducing agent is selected from the class consisting of methyl, ethyl and isobutyl.

11. A process according to claim 10, wherein said aluminum nickel salt mole ratio is approximately 3.0.

12. A process according to claim 11, wherein the amount of said ligand metallic salt is approximately 1 millimole per 100 grams of said polymer.

13. A process according to claim 8, wherein said temperature ranges from about −20° C to about 150° C.

14. A process according to claim 13, wherein said pressure ranges from about 1 atmosphere to about 3,000 PSIG.

15. A process according to claim 14, wherein said pressure ranges from about 25 to about 1,000 PSIG.

16. A process according to claim 8, wherein said temperature ranges from about 0° C to about 80° C and said pressure ranges from about 25 to about 500 PSIG.

17. A process according to claim 8, wherein said temperature ranges from about 0° C to about 100° C and said pressure ranges from about 500 to about 15,000 PSIG.

* * * * *